US012722807B2

(12) United States Patent
de St Amatus et al.

(10) Patent No.: US 12,722,807 B2
(45) Date of Patent: Sep. 1, 2026

(54) NEAR ZERO-MASS CHANGE PROPULSION SYSTEM FOR INTERPLANETARY AND INTERSTELLAR SPACECRAFT

(71) Applicants: Benedict de St Amatus, Forest Glen (AU); Alexander de St Amatus, Forest Glen (AU)

(72) Inventors: Benedict de St Amatus, Forest Glen (AU); Alexander de St Amatus, Forest Glen (AU)

( * ) Notice: Subject to any disclaimer, the term of this patent is extended or adjusted under 35 U.S.C. 154(b) by 78 days.

(21) Appl. No.: 19/001,439

(22) Filed: Dec. 25, 2024

(65) Prior Publication Data

US 2026/0176001 A1 Jun. 25, 2026

(51) Int. Cl.
*B64G 1/40* (2006.01)

(52) U.S. Cl.
CPC .............. *B64G 1/409* (2013.01); *B64G 1/411* (2023.08); *B64G 1/413* (2023.08); *B64G 1/417* (2023.08)

(58) Field of Classification Search
CPC ........ B64G 1/409; B64G 1/411; B64G 1/413; B64G 1/417
See application file for complete search history.

(56) References Cited

U.S. PATENT DOCUMENTS

| | | | | |
|---|---|---|---|---|
| 6,565,044 | B1 * | 5/2003 | Johnson | B64G 1/648 244/171.5 |
| 2003/0213874 | A1 * | 11/2003 | Ockels | B64G 1/413 244/171.1 |
| 2004/0245407 | A1 * | 12/2004 | D'Ausilio | B64G 1/1078 244/171.1 |
| 2005/0001102 | A1 * | 1/2005 | Schubert | B64G 1/26 244/164 |
| 2007/0045474 | A1 * | 3/2007 | Bae | B64G 1/1085 244/171.1 |
| 2025/0091734 | A1 * | 3/2025 | Tiago Baptista De Alves Martins | H02N 11/006 |

OTHER PUBLICATIONS

Zubrin, Robert M. et al., Magnetic Sails and Interplanetary Travel, Journal of Spacecraft and Rockets, 28(2), pp. 197-203, 1991 (Year: 1991).*

Janhunen, P., et al, Electric Solar Wind Sail: Toward Test Missions, Review of Scientific Instruments 81, 111301, pp. 1-11, 2010 (Year: 2010).*

Michaells, Max M., et al, Laser Propulsion: A Review, South African Journal of Science 102, pp. 289-295, 2006 (Year: 2006).*

* cited by examiner

*Primary Examiner* — Scott J Walthour

(57) ABSTRACT

The current invention relates to a spacecraft propulsion system designed to enable travel through interplanetary and interstellar spaces. The propulsion system functions by modifying the momentum of electrons ejected from the spacecraft as they interact with external electric fields found in both interplanetary and interstellar settings. Additionally, it incorporates a mechanism to maintain the spacecraft's mass and electric charge neutrality. Such an approach enables the spacecraft to accelerate or decelerate without the traditional requirement of expelling propellant mass.

7 Claims, 1 Drawing Sheet

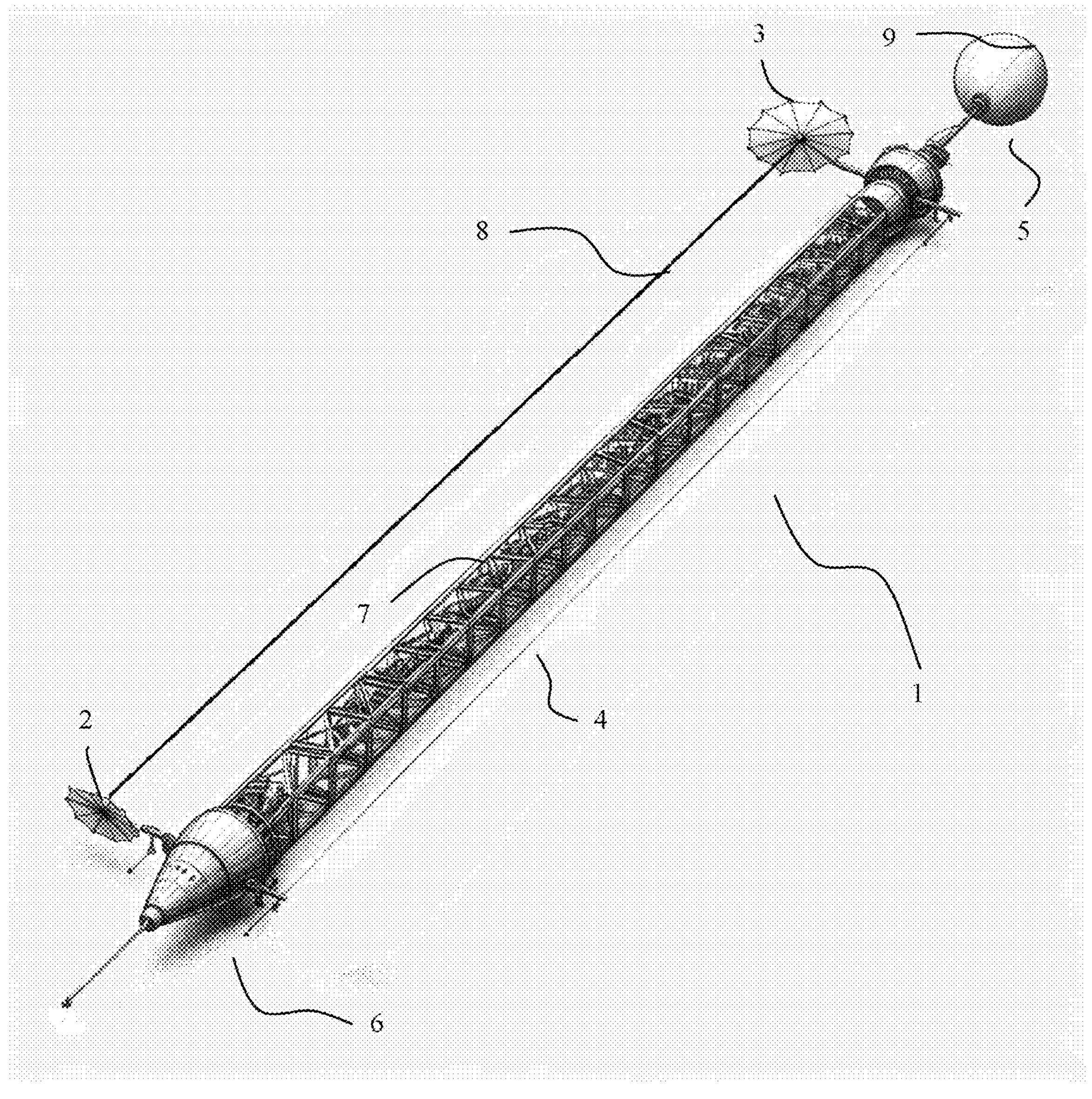
3
9
8
5
7
1
4
2
6

NEAR ZERO-MASS CHANGE PROPULSION SYSTEM FOR INTERPLANETARY AND INTERSTELLAR SPACECRAFT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The present invention relates to the field of aerospace engineering, specifically to propulsion systems for spacecrafts designed for interplanetary and interstellar travels, with a focus on near zero-mass change propulsion systems for these spacecrafts.

DESCRIPTION OF RELATED ART

The field of aerospace engineering has continuously strived to develop propulsion systems that overcome the challenges of long-duration interplanetary and interstellar travel. Traditional propulsion mechanisms for space vehicles have primarily relied on the ejection of propellant mass to generate thrust, adhering to Newton's third law of motion. While chemically fuelled rockets have been effective for exiting Earth's atmosphere and carrying out short-range missions, their utility is significantly limited by the finite amount of propellant that can be carried onboard. This limitation imposes constraints on the range and duration of the missions, making long-duration travel and deep space exploration challenging.

Recent advancements in the field have led to the exploration of electric and ion propulsion systems. The electric propulsion systems, including ion and Hall effect thrusters, offers higher efficiency by accelerating charged particles to high speeds. However, even these advanced systems are still bound by the limitations of carrying propellant and the associated inefficiencies and costs.

The pursuit of sustainable and efficient space travel has led researchers to explore alternative methods that could potentially eliminate or significantly reduce the reliance on propellant mass. Among these, various concepts of electromagnetic propulsion have emerged, seeking to leverage external forces and interactions without the need for onboard propellant. Concepts such as photonic propulsion, which involves using photons to propel spacecrafts, have also been explored.

In contrast to conventional propulsion proposals, numerous theoretical frameworks for faster-than-light travel, warp drives, and antigravity have emerged. These concepts frequently lack a robust physical basis and remain speculative. The fundamental principles of physics, particularly the conservation of energy and momentum, remain unchallenged to date. Unless evidence emerges demonstrating the breakdown of these conservation laws under specific conditions or scales, any discussion of such advanced propulsion methods must adhere to these principles. This implies that for a spacecraft to achieve propulsion, it must engage in energy and momentum transfer from an external source, such as a localised force field. This external source, in turn, must derive its energy and momentum from other entities within the universe, thereby ensuring the conservation of both energy and momentum.

Interplanetary and interstellar electric fields are components of the electromagnetic environments in space, varying significantly in strength, origin, and effects across different regions of the solar system and the galaxy. These fields play crucial roles in shaping the dynamics of charged particles in space, influencing everything from solar wind behaviour to the propagation of cosmic rays.

The interplanetary electric fields are found within the solar system and are primarily generated by the solar wind, a stream of charged particles (electrons and protons) emitted by the Sun. These fields are part of the larger heliospheric environment, which extends from the Sun to the boundary of the solar system where it meets the interstellar medium. The interplanetary electric fields influence the trajectories of charged particles travelling through the solar system, contribute to space weather phenomena, and can affect the environments around planets, particularly those with magnetic fields like Earth.

The interstellar electric fields exist in the space between stars within the galaxy. These fields are weaker and more difficult to measure directly than interplanetary electric fields but are an essential part of the galactic environment.

Interstellar electric fields can be generated by several mechanisms, including the relative motion between the interstellar medium (ISM) and the magnetic field it carries, and by astrophysical processes such as stellar winds, supernova explosions, and the motion of ionized gas clouds. Galactic dynamics, such as the rotation of the Milky Way, also contribute to the overall electromagnetic environment. These electric fields, along with interstellar magnetic fields, influence the propagation and energy distribution of cosmic rays—high-energy particles travelling through the galaxy. They also play a role in the dynamics of the ISM, affecting star formation processes and the evolution of galactic structures.

The interaction between an electric field and a charged particle travelling within that field is governed by the Coulomb force, also known as the electrostatic force. This force acts between electrically charged particles and is described by Coulomb's law. The law states that the force between two point charges is directly proportional to the product of the magnitudes of the charges and inversely proportional to the square of the distance between them. The direction of the force depends on the nature of the charges (attractive if the charges are opposite and repulsive if the charges are the same). For a charged particle moving in an electric field, this electrostatic force influences its motion, altering its velocity and direction depending on the particle's charge and the field's characteristics.

The foundational principles underlying interplanetary and interstellar electric and magnetic fields have applications in the conceptualisation and development of several propulsion systems for spacecraft that operate without mass change, including:

The Magnetic Sail (MagSail) concept, which involves using a spacecraft's magnetic field to interact with the solar wind's charged particles. A large loop or coil aboard the spacecraft generates a magnetic field that extends far into space, creating a magnetic barrier. This barrier reflects and redirects solar wind particles, imparting momentum to the spacecraft in the opposite direction, thus propelling it without expending traditional propellant. The momentum transfer from the solar wind to the spacecraft through the magnetic field effectively allows the spacecraft to "sail" on the solar wind. The strength of the magnetic field and its interaction with the solar wind can be adjusted to change the spacecraft's velocity and trajectory.

The Electric Sail (E-Sail) concept utilises long, thin, electrically charged tethers to generate an electric field that interacts with the solar wind. The positively charged tethers repel the positively charged protons in the solar wind, creating thrust that propels the spacecraft. By varying the voltage on the tethers, the spacecraft can modulate the electric field's strength and thus control the force exerted by the solar wind, allowing for propulsion and manoeuvrability in space. The E-Sail does not rely on solar radiation pressure but on the dynamic pressure of the solar wind's charged particles.

The Induced Magnetosphere Propulsion (IMP) involves creating an artificial magnetosphere around the spacecraft to interact with the ambient interplanetary or interstellar magnetic field. This interaction generates a force on the spacecraft, propelling it without the need for onboard propellant. The artificial magnetosphere is generated by emitting a plasma cloud around the spacecraft or by electrical currents running through coils or wires on the spacecraft. The interaction between the artificial magnetosphere and the ambient magnetic field can be tailored to produce a net force in the desired direction of travel.

MagSail, E-Sail, and IMP technologies, each with the promise of propellantless space travel by leveraging solar wind or magnetic fields, face significant technical challenges. MagSails, for instance, necessitate the generation of large magnetic fields, requiring substantial power and sophisticated cooling for superconducting coils, posing issues in mass, volume, and the potential for increased radiation hazards due to trapped charged particles. E-Sails depend on the deployment of lengthy, thin conducting tethers, vulnerable to damage from micrometeoroids and solar radiation, with their efficiency waning as the solar wind weakens with distance from the Sun. Both systems also grapple with complex deployment, control, and navigation challenges, constrained by the variability of space environments. IMP shares the hurdle of high energy demands for generating a stable magnetosphere capable of interacting with the solar wind for propulsion, alongside challenges in maintaining magnetosphere stability and avoiding spacecraft charging that could jeopardise onboard systems. These technologies' effectiveness is inherently tied to the solar wind's strength and direction, limiting manoeuvrability and precise trajectory adjustments critical for mission success.

In summary, the prior art in space vehicle propulsion is characterised by a continuous quest to extend the range and sustainability of missions through increased propulsion efficiency and reduced dependency on propellant mass. While significant advancements have been made, including the development of MagSail, E-Sail, and IMP technologies, a gap remains in achieving a fully sustainable and efficient propulsion mechanism for long-duration interplanetary and interstellar travel. The present invention addresses these challenges by introducing a novel propulsion system that utilises electromagnetic forces, aiming to offer a more sustainable and efficient solution for space travels.

OBJECT OF THE INVENTION

The object of the present invention is to provide a spacecraft's propulsion system that significantly reduces or eliminates the reliance on propellant mass, thereby extending the potential range and duration of space missions. The invention seeks to offer a more sustainable and efficient solution for interplanetary and interstellar travel, addressing the limitations of current propulsion technologies.

SUMMARY OF THE INVENTION

The present invention relates to a propulsion system for spacecrafts, designed to operate in a vacuum environment without altering the spacecraft's mass or electrical charge neutrality.

The spacecraft propulsion system utilises the principles of momentum conservation and the modulation of electron momentum in response to external electric fields. Central to this system is a motor equipped with at least one electron emitter that projects one or more beams of electrons towards a target. These electrons have initial momenta that are altered by external electric fields encountered en route to the target, resulting in a reduction of their momenta. This interaction propels the spacecraft in the direction opposite to the electron beam's propagation without the need for mass expulsion, enabling both acceleration and deceleration depending on the orientation of the emitter and target, which can be swapped as needed.

Key features of the spacecraft propulsion system include: a motor mounted on a non-deformable and non-elastic frame that aligns with the spacecraft's trajectory; the use of electrically conductive materials for the target to facilitate the return of electric charges via a conductor to the emitter, thereby maintaining the spacecraft's electric charge neutrality; an integrated energy source, complete with fuel reservoirs, distribution mechanisms, conversion units, sensors, and control apparatuses, provides the necessary power to the motor and supports the operation of other spacecraft components; adjustable distances between the emitter and target on the frame allow the system to adapt to changes in the intensity and direction of external electric fields; the inclusion of sensors and control mechanisms for adjusting the emitter and target orientation in response to the interstellar magnetic field; a design that prevents the dispersion of the electron beam into space by ensuring the target's reception area is larger than the beam's cross-section; and a dynamic charge neutralisation system, comprising a plurality of ion thrusters, which maintains the spacecraft's charge neutrality by compensating for imbalances caused by the emission of electrons during the initiation and cessation of the spacecraft motor's operation.

BRIEF DESCRIPTION OF THE DRAWING

By way of illustration only, an embodiment of the invention is described more fully hereinafter with reference to the accompanying drawing, in which FIG. 1 depicts a conceptual representation of the propulsion system, arranged to facilitate the spacecraft's acceleration.

Herein, the spacecraft travels in vacuum and its components are influenced by the presence of external electric and magnetic fields. These fields may originate from various sources, including solar, interstellar, intergalactic, artificial, or any combination thereof.

In this embodiment, the spacecraft's propulsion system includes a minimum of one Motor 1. Motor 1 consists of several components, featuring at least one Emitter 2, at least one Target 3, and at least one Conductor 4.

The spacecraft is equipped with a minimum of one Energy Source 5 and one Payload 6, in addition to an array of sensors and control mechanisms. These parts, along with Motor 1, are affixed to at least one Frame 7. Frame 7 is constructed as a non-deformable and non-elastic beam, with its main axis aligned with the trajectory of the spacecraft.

Energy Source 5, which is integrated with its dedicated fuel reservoirs, fuel distribution mechanisms, energy conversion units, sensors, and control apparatuses, provides the necessary power for Motor 1, Payload 6, as well as the spacecraft's array of sensors and control mechanisms.

In Motor 1, Emitter 2 emits at least one stream of electrons, denoted as Beam 8, directed at Target 3, upon which Beam 8 impacts.

Target 3 is constructed from an electrically conductive material, facilitating the return of the received electric charges back to Emitter 2 via Conductor 4. Said Conductor 4 is an electrical conductor configured as a non-deformable and non-elastic line. Conductor 4 serves as a link between Emitter 2 and Target 3, thus preserving the electric charge neutrality in the spacecraft.

In this embodiment, the positions of Emitter 2 and Target 3 on Frame 7 are interchangeable, thereby enabling a switch between modes of acceleration and deceleration for the spacecraft, and in response to variations in the direction of the external electric field. For example, during the acceleration phase, Emitter 2 releases electrons in a direction opposite to the spacecraft's intended trajectory. For deceleration, Emitter 2 and Target 3 swap positions on Frame 7, enabling Emitter 2 to discharge electrons in alignment with the spacecraft's trajectory.

The distance between Emitter 2 and Target 3 on Frame 7 is dynamically adjustable, allowing for adaptation to the current intensity of the interstellar electric field. Additionally, to counteract the deviation of Beam 8 caused by the interstellar magnetic field, Emitter 2 and Target 3 are situated on planes oriented at varying angles to the main axis of Frame 7. These angles can be dynamically modified based on the strength and orientation of the interstellar magnetic field. Mechanisms for repositioning Emitter 2 and Target 3 along Frame 7 are integrated into both Emitter 2 and Target 3.

In this embodiment, a Dynamic Charge Neutralisation (DCN) System 9, comprising a plurality of ion thrusters, maintains the spacecraft's charge neutrality by compensating for imbalances caused by the emission of electrons during the initiation and cessation of Motor 1's operation.

DETAILED DESCRIPTION OF THE INVENTION

The embodiment of the near zero-mass change spacecraft for interplanetary and interstellar travels according to the present invention is shown with references to FIG. 1.

In this embodiment, the propulsion system operates by leveraging the interaction between the emitted electrons and the external electric field. The electrons that make up Beam 8 possess inherent electric charges and rest mass, enabling the transmission of electric charge and momentum between Emitter 2 and Target 3. Upon being emitted by Emitter 2 into the vacuum, the electrons carry an initial momentum. Yet, during their journey towards Target 3, they encounter an external electric field, which leads to a reduction in their initial momentum as a result of this interaction. Therefore, by the time the electrons reach Target 3, their momentum is reduced compared to when they were first emitted.

The variance in electron momenta between Beam 8's initiation at Emitter 2 and its arrival at Target 3 precipitates spacecraft's motion in the reverse direction of the electron beams' propagation, a phenomenon consistent with the momentum conservation law.

The act of emitting electrons from Emitter 2 along the spacecraft's intended path induces a reciprocal force on the emitter, directed against the electrons' emission direction, in compliance with the conservation of momentum principle. The emission of electrons from Emitter 2 towards Target 3 establishes an electric potential difference as the emitted electrons accumulate on Target 3, making it negatively charged relative to Emitter 2. This potential difference drives electrons back to Emitter 2 via Conductor 4.

In this embodiment, the Motor 1 includes two distinctive paths for electron movement, the Emitter 2-Target 3 path and the Conductor 4 path, with the Emitter 2-Target 3 path facilitating propulsion through energy exchange of the emitted electrons with an external electric field, causing a decrease in electron momentum due to work performed by the external electric field as electrons initially exhibit high momentum and experience interaction with the external electric field, resulting in deceleration. The Conductor path 4 preserves the charge neutrality of the Motor 1 by returning electrons from the Target 3 to the Emitter 2 with negligible external force interaction due to the shielding effect of the conductor, thereby ensuring that the return of electrons does not alter the overall momentum of the spacecraft.

The return of charge to Emitter 2 via Conductor 4 appears almost instantaneous at the macroscopic level, especially when the conductor is a superconductor exhibiting negligible resistance. This rapid propagation of electrical signals is facilitated by their movement at speeds approaching a significant fraction of the speed of light. Nonetheless, this swift movement of charge does not influence the overall momentum of the spacecraft. This is because the electrons' drift within Conductor 4, responsible for the charge movement, does not involve external forces that could accelerate or decelerate the mass of the electrons, thus leaving the spacecraft's overall momentum unaffected.

A natural expansion of Beam 8 along its trajectory is anticipated due to the mutual repulsion among the electrons within said beam. To prevent the dispersion of electrons into space, the current design ensures that the target's reception area surpasses the beam's cross-sections.

Under steady environmental conditions, with negligible variations in the intensity and direction of external electric fields, a constant number of electrons travel between the Emitter 2 and the Target 3, requiring the DCN System 9 to eject positive charges (protons) into the vacuum environment to counterbalance the net positive charge on the spacecraft only during the initiation of Motor 1. Similarly, the DCN System 9 ejects excess electrons into the vacuum upon cessation of Motor 1 to counterbalance residual negative charges on the spacecraft. These operations prevents charge accumulation that would otherwise result in Lorentz forces acting on both the ejected electrons and the spacecraft, causing equal and opposite momentum changes that cancel each other. The DCN System 9 operates with negligibly small masses of protons and electrons relative to the spacecraft's mass and functions solely during transient charge imbalances at operational transitions. Sensors and feedback mechanisms regulate the emission of positive and negative charges, ensuring dynamic charge neutralisation and nullifying residual charge accumulation, thereby mitigating external electromagnetic forces on the spacecraft.

In this embodiment, the DCN System 9 operates independently of the primary propulsion components, using a dedicated power supply to avoid interference with other subsystems. The ejection of protons and electrons by the DCN System 9's ion thrusters occurs from positions selected to counterbalance the momenta of the ejected protons and electrons, ensuring no unintended interference with the spacecraft's intended trajectory.

In summary, the spacecraft's ability to accelerate and decelerate using the near zero-mass change propulsion system is derived from the principles of momentum conservation and the alternation of electron momentum in response to external electric fields. In this system, electrons are emitted by the emitter with a specific initial momentum. When these electrons encounter an external electric field during their travel towards the target, their momentum is altered. This interaction results in a reduction of the electrons' momentum upon reaching the target compared to their initial state. According to the law of momentum conservation, this change in electron momentum causes the spacecraft to move in the opposite direction to the electron beam's propagation, thereby facilitating acceleration. For deceleration, the emitter and target swap positions, allowing the electron beam to be emitted in the direction of the spacecraft's trajectory. This reverse emission generates a reciprocal force that decelerates the spacecraft. The system's design enables both acceleration and deceleration of the spacecraft without expelling mass, while also preserving the spacecraft's electric charge neutrality.

The invention claimed is:

1. A propulsion system with near-zero mass change for a spacecraft operating in at least one of an interplanetary vacuum environment and an interstellar vacuum environment, comprising:

at least one motor comprising:

at least one emitter configured to emit electrons into at least one of the interplanetary vacuum environment and the interstellar vacuum environment to form a beam of electrons along a trajectory of the spacecraft;

at least one target positioned at a distance from the at least one emitter, the at least one target being composed of an electrically conductive material and configured to receive the beam of electrons; and at least one conductor electrically coupling the at least one target to the at least one emitter, wherein electrons received by the at least one target are returned to the at least one emitter via the at least one conductor, thereby maintaining electric charge neutrality of the spacecraft;

the propulsion system further comprising:

at least one dynamic charge neutralisation system;

at least one sensor;

at least one control mechanism;

at least one energy source configured to supply power to the at least one motor, the at least one dynamic charge neutralisation system, at least one payload of the spacecraft, the at least one sensor, and the at least one control mechanism; and at least one frame having a main axis aligned with a trajectory of the spacecraft and configured to support the at least one motor, the at least one dynamic charge neutralisation system, the at least one payload, the at least one sensor, the at least one control mechanism, and the at least one energy source;

wherein the at least one motor includes two distinct paths for electron movement, the two distinct paths comprising a first electron movement path and a second electron movement path, the first electron movement path comprising an emitter-target path between the at least one emitter and the at least one target through at least one of the interplanetary vacuum environment and the interstellar vacuum environment, and the second electron movement path comprising a conductor return path through the at least one conductor, wherein propulsion of the spacecraft results from a difference between momentum change of electrons travelling along the emitter-target path and momentum change of electrons travelling along the conductor return path, wherein electrons travelling along the emitter-target path interact with an external electric field such that work performed by the external electric field causes a decrease in momentum of the emitted electrons before the emitted electrons are received by the at least one target, and wherein electrons travelling along the conductor return path are shielded by the at least one conductor from the external electric field such that momentum exchange between the electrons travelling along the conductor return path and the external electric field is lower than momentum exchange occurring along the emitter-target path, thereby producing propulsion of the spacecraft in a direction opposite to propagation of the beam of electrons.

2. The propulsion system of claim 1, wherein the at least one emitter and the at least one target are configured to be selectively interchanged in position along the at least one frame to alternate the propulsion system between an acceleration mode and a deceleration mode of the spacecraft.

3. The propulsion system of claim 1, wherein a distance between the at least one emitter and the at least one target on the at least one frame is dynamically adjustable in response to variations in intensity of the external electric field, variations in direction of the external electric field, or both.

4. The propulsion system of claim 1, wherein, to counteract deviation of the beam of electrons caused by variations in the external magnetic field, the at least one emitter and the at least one target are situated on planes oriented at dynamically adjustable angles relative to the main axis of the at least one frame.

5. The propulsion system of claim 1, wherein the at least one target includes a reception area facing the beam of electrons, the reception area exceeding a cross-sectional area of the beam of electrons at the at least one target, thereby preventing electrons of the beam of electrons from dispersing into space.

6. The propulsion system of claim 1, wherein the at least one dynamic charge neutralisation system comprises a plurality of ion thrusters configured to eject positive charges in the form of protons into at least one of the interplanetary vacuum environment and the interstellar vacuum environment during initiation of the at least one motor to counterbalance net positive charges caused by electron emissions, with the at least one dynamic charge neutralisation system designed to operate such that positive charges are ejected into at least one of the interplanetary vacuum environment and the interstellar vacuum environment only during the initiation of the at least one motor, and the at least one dynamic charge neutralisation system is further configured to eject excess electrons into at least one of the interplanetary vacuum environment and the interstellar vacuum environment upon cessation of the at least one motor to counterbalance residual negative charges, thereby preventing charge accumulation.

7. The propulsion system of claim 6, wherein the ejection of protons and electrons by the ion thrusters occurs from positions selected to counterbalance momenta of the ejected protons and electrons.

* * * * *